United States Patent
Falik et al.

(10) Patent No.: US 7,318,173 B1
(45) Date of Patent: Jan. 8, 2008

(54) EMBEDDED CONTROLLER BASED BIOS BOOT ROM SELECT

(75) Inventors: Ohad Falik, Kfar Saba (IL); Ilia Stolov, Molon (IL)

(73) Assignee: National Semiconductor Corporation, Santa Clara, CA (US)

( * ) Notice: Subject to any disclaimer, the term of this patent is extended or adjusted under 35 U.S.C. 154(b) by 593 days.

(21) Appl. No.: 10/453,851

(22) Filed: Jun. 3, 2003

Related U.S. Application Data (60) Provisional application No. 60/385,478, filed on Jun. 3, 2002.

(51) Int. Cl.
*G06F 11/00* (2006.01)
(52) U.S. Cl. .................. 714/36; 713/1; 713/2
(58) Field of Classification Search .................. 714/36
See application file for complete search history.

(56) References Cited

U.S. PATENT DOCUMENTS

| | | | | |
|---|---|---|---|---|
| 5,805,882 | A | * | 9/1998 | Cooper et al. ................. 713/2 |
| 5,819,087 | A | * | 10/1998 | Le et al. ........................ 713/2 |
| 6,651,188 | B2 | * | 11/2003 | Harding et al. ............... 714/38 |

OTHER PUBLICATIONS

Intel Enterprise Server Group—http://www.buero-shop.at/C/Bedienungsanleitungen/Komponenten/Motherboards/Intel/mb4401x/28299402.pdf.*
Wikipedia (SMBus)—http://En.Wikipedia.org/Wiki/SMBus.*

* cited by examiner

*Primary Examiner*—Yolanda L Wilson (57) ABSTRACT

A method for selecting one of a plurality of BIOS images included in a computer system includes indicating a selection of a BIOS image via a bus by an embedded controller. The method also includes powering up or resetting the system. In addition, the method includes accessing the selected BIOS image for execution.

19 Claims, 7 Drawing Sheets

| | Byte | Data Field |
|---|---|---|
| Request Data | 1 | 0h = Reserved<br>1h = Selects BIOS Image A<br>2h = Selects BIOS Image B<br>3h = Permits read/write access to BIOS Image A<br>4h = Permits read/write access to BIOS Image B<br>5h = Permits read only access to BIOS Image A<br>6h = Permits read only access to BIOS Image B<br>7h = System wake-up<br>[8h:FFh] = Reserved |
| Response Data | 1 | Completion Code |

EMBEDDED CONTROLLER BASED BIOS BOOT ROM SELECT

FIELD AND BACKGROUND OF THE INVENTION

This patent application claims priority under 35 U.S.C. § 119(e) to U.S. Provisional Patent Application No. 60/385,478 filed on Jun. 3, 2002.

When a computer system is turned on, the basic input-output system ("BIOS") image located in the non-volatile memory starts up the computer. As part of the start-up process, the BIOS typically checks that the computer components are operational, locates the boot program for loading the operating system, and passes control of the computer to the operating system once the operating system files have been loaded.

More than one BIOS image may be stored by the computer system. For example, in order to improve the reliability of the computer system, an earlier version of the BIOS image may be maintained as a backup. The earlier version can be for example the version from manufacture or the version from the last BIOS update. As another example, one of the stored BIOS images may include extra features which only need to be performed for certain start ups of the computer. When more than one BIOS image is stored, one of the stored BIOS images is selected for starting up the computer system.

Figure 1:
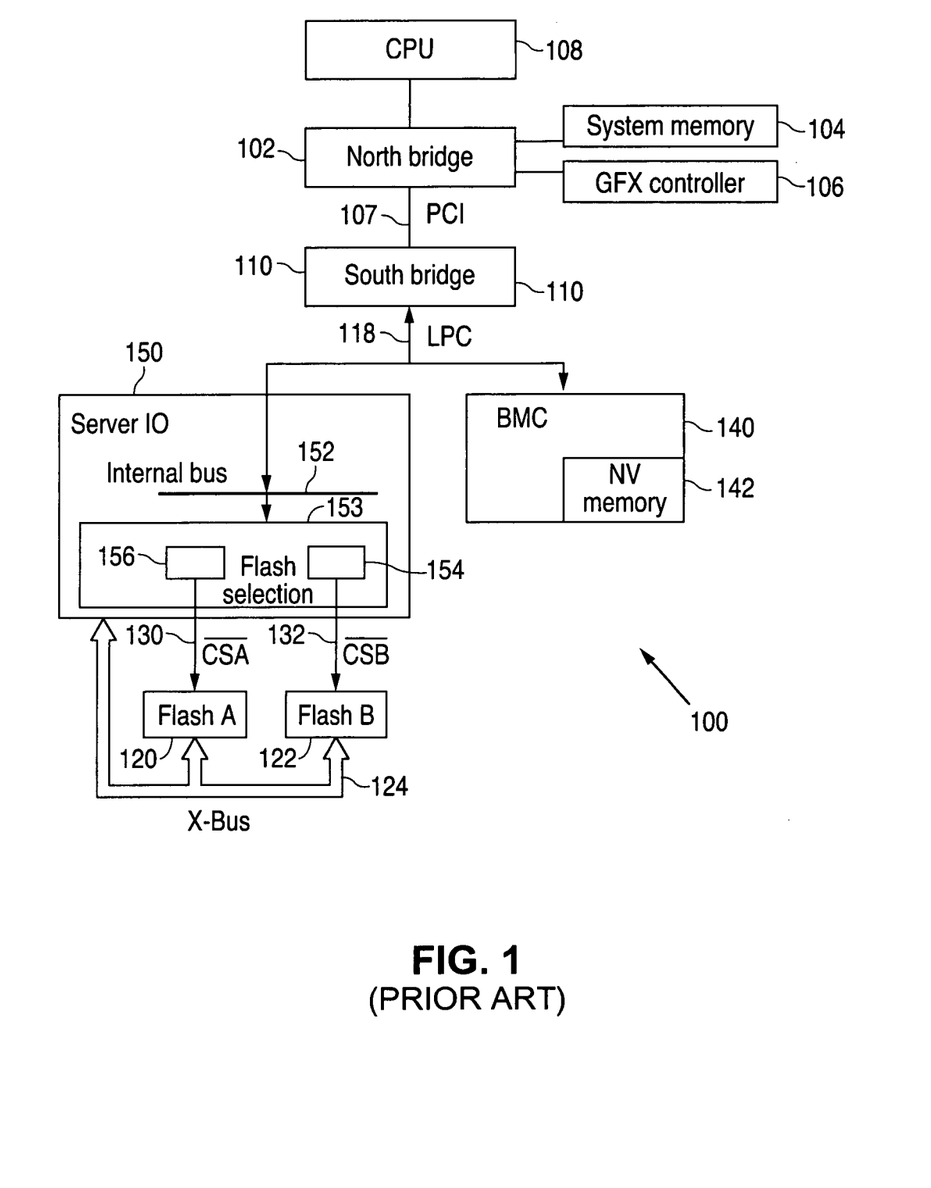
FIG. 1 is a block diagram of a prior art computer system with BIOS selection.

FIG. 1 illustrates a prior art computer system 100. A bus 118 couples a central processing unit ("CPU") 108, a server input/output ("ServerIO") 150 and a baseboard management controller ("BMC") 140. BMC 140 is typically on a separate chip than ServerIO 150, however a single chip for ServerIO 150 and BMC 140 is also feasible. CPU 108 is coupled through a north bridge 102 to a system memory 104 (RAM and/or ROM) and a GFX controller 106. A south bridge 110 and a bus 107 couple bus 118 and north bridge 102. An external bus ("X-bus") 124 couples a flash A 120, a flash B 122 and ServerIO 150. Herein below, bus 118 is assumed to be a low pin count bus ("LPC") and bus 107 is assumed to be a PCI bus, however other buses can be substituted. Included in flash A 120 is one of the BIOS versions and included in flash B 122 is the other BIOS version. Included in BMC 140 is a nonvolatile memory 142. Included in ServerIO 150 are an internal bus 152 and a flash selection module 153. Flash selection module 153 includes two registers 156 and 154 which are controlled by CPU 108 and enable chip select A 130 and chip select B 132 respectively.

In one example of operation, CPU 108 causes either control register 154 or control register 156 to be reset. If control register 156 is reset, then chip select A ("CSA") 130 is asserted and the BIOS in Flash A 120 is accessed. If control register 154 is reset, then chip select B ("CSB") is asserted and the BIOS in Flash B 122 is accessed. Once the desired flash is selected, CPU 108 selects addresses within the BIOS image of the selected flash via ServerIO 150 and X-Bus 124.

A limitation of system 100 relates to the control of the BIOS selection solely by CPU 108. If the CPU 108 is not able to control the selection when the active BIOS needs be changed for the other BIOS, the required changeover will not occur. CPU 108 may not be able to control the selection, for example if the active BIOS is damaged and CPU 108 can not begin running commands from the BIOS.

Figure 2:
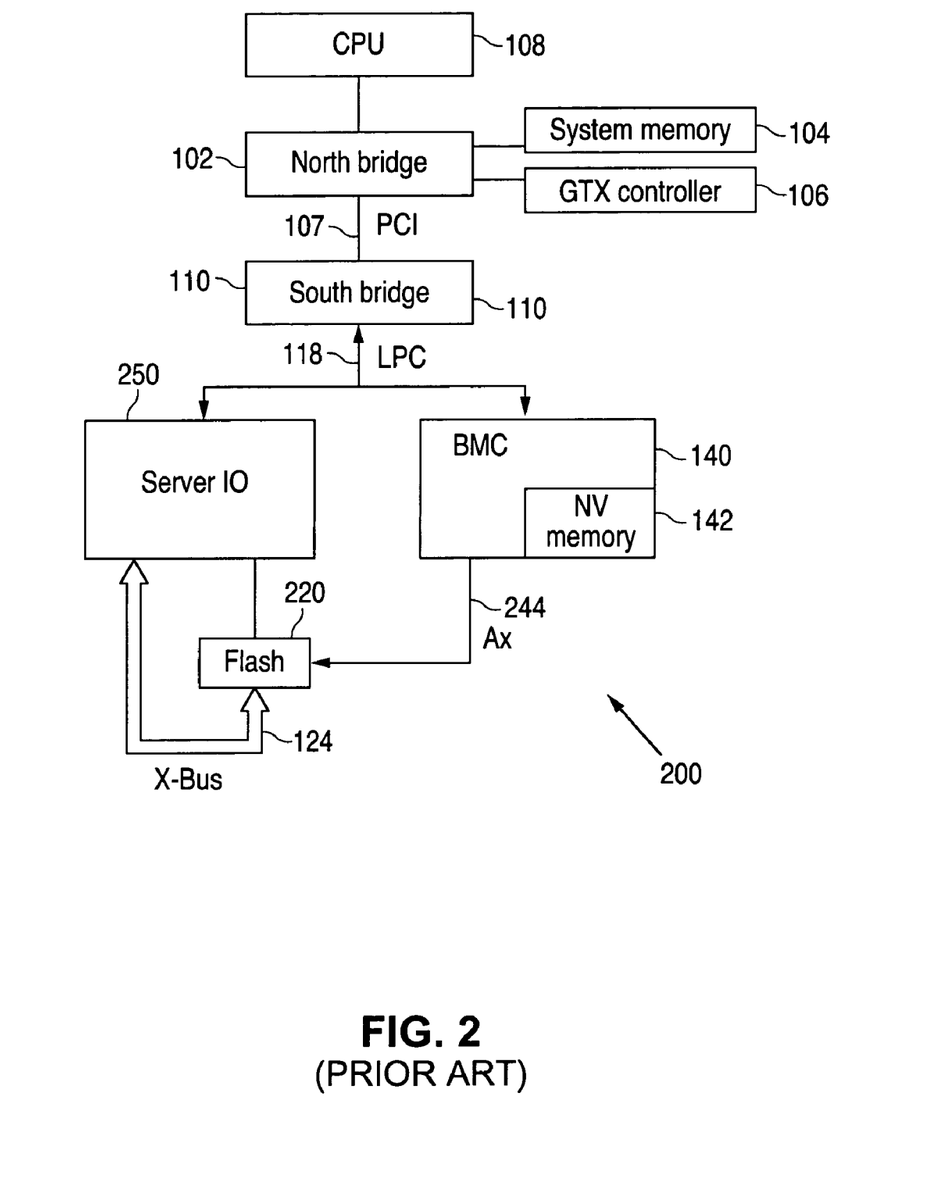
FIG. 2 is an alternative prior art computer system with BIOS selection.
Figure 3:
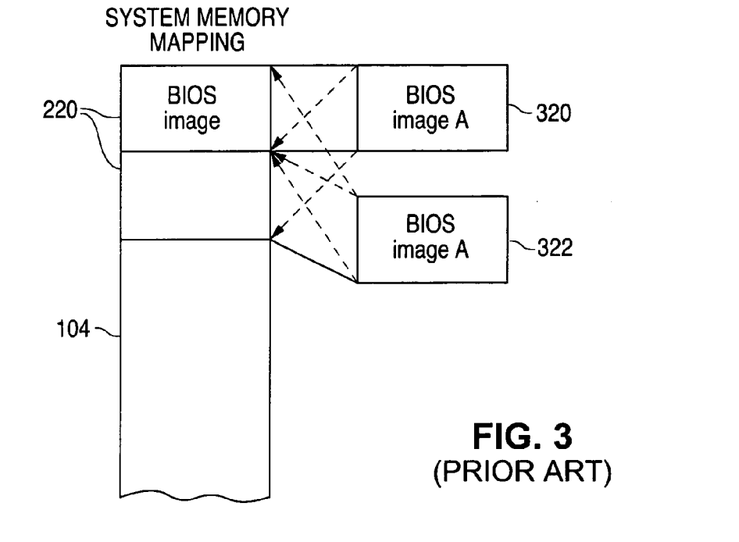
FIG. 3 illustrates prior art system memory mapping

FIG. 2 shows an alternative prior art system 200, using memory management. The two BIOS images are stored in one flash 220. In operation, BMC 140 controls the selection of the BIOS image through address line (Ax) 244. Refer to FIG. 3. From the point of view of CPU 108, system memory 104 and flash memory 220 are accessible memory. BIOS image A or B, selected by Ax 244 is placed in the top position. In FIG. 3, the unbroken lines represent the case when BIOS image A 320 was the BIOS selected and the broken lines represent the instance when BIOS image B 322 was the BIOS selected. Once the desired BIOS image has been selected, CPU 108 through ServerIO 250 and X-Bus 124 chooses addresses within the selected BIOS image.

A limitation of system 200 relates to the possible inconsistency due to the non-standardized access to the BIOS by CPU 108 and BMC 140. It is therefore difficult to arbitrate BIOS selection between CPU 108 and BMC 140.

Related art systems include U.S. Pat. No. 6,282,642 to Cromer et al, describing a computer system which can be pre-set over a network to boot to a first or second remote boot protocol prior to being powered on over the network. The system is coupled to a remote computer via a data communication link. The system includes a communication subsystem for communicating data with the computer system. The communication subsystem is supplied with auxiliary power and is operative to communicate with the computer system regardless of whether the computer system is in a normal operating state. The remote computer includes a program for sending a first packet to the computer system via the communication link. The first packet contains a boot parameter which is indicative of the first or second remote boot protocol. The computer system is operative to receive the first packet via the communication subsystem and store the boot parameter in a memory thereof without powering on. The memory is accessed by BIOS during a network boot sequence and the system will boot in accordance with the specified boot protocol stored in the memory.

Another related art system includes U.S. Pat. No. 6,282,643 also to Cromer et al., disclosing a personal computer system which includes a central processing unit (CPU) coupled to a direct access storage device (DASD), a random access memory (RAM), and a LAN controller. A flash memory module is coupled to the CPU and an input/output (IO) bus and includes a basic input/output system (BIOS) stored therein. The BIOS is effective for responding to the energization of the computer system by initiating a power on self test (POST). The BIOS is further operative on completion of the POST for transferring a portion of BIOS from the module to the RAM and for transferring control of the computer system to the BIOS portion. The portion of BIOS is operative to load a protected mode operating system (OS) into RAM and transfer control to the OS. The system further includes a logic circuit coupled to the flash memory and the IO bus. A communication subsystem is coupled to the IO bus, the logic circuit and the flash memory for allowing the remote computer to access the BIOS in flash memory while the protected mode OS is running.

What is needed in the art is a system and method for improved management of more than one BIOS image.

SUMMARY OF THE INVENTION

According to the present invention there is provided a system for selecting one of a plurality of BIOS images, including: a server input/output configured to access a plurality of BIOS images; an embedded controller configured to select one of a plurality of BIOS images for access; and a bus coupling the embedded controller and the server input/output which is configured to transfer an indication of selection from the embedded controller to the server input/output.

According to the present invention there is also provided a system for automatic switching of BIOS images, including: a watch-dog configured to detect a malfunction in execution of a BIOS image; and a selector configured to select an alternate BIOS image.

According to the present invention there is further provided a method for selecting one of a plurality of BIOS images included in a computer system, including: an embedded controller indicating a selection of a BIOS image via a bus; powering up or resetting the system; and accessing the selected BIOS image for execution.

According to the present invention there is still further provided a method for automatic switching of BIOS images for a computer system, including: detecting a malfunction in execution of a BIOS image; powering down or resetting the system; selecting an alternate BIOS image; powering up or resetting the system; and accessing the alternate BIOS image for execution.

According to the present invention there is yet further provided a program storage device readable by machine, tangibly embodying a program of instructions executable by the machine to perform method steps for automatic switching of BIOS images for a computer system, including: detecting a malfunction in BIOS execution; powering down or resetting the system; selecting an alternate BIOS image; powering up or resetting the system; and accessing the alternate BIOS image for execution.

According to the present invention there is still yet further provided a computer program product comprising a computer useable medium having computer readable program code embodied therein for automatic switching of BIOS images for a computer system, the computer program product including: computer readable program code for causing the computer to detect a malfunction in BIOS execution; computer readable program code for causing the computer to power down or reset the system; computer readable program code for causing the computer to select an alternate BIOS image; computer readable program code for causing the computer to power up or reset the system; and computer readable program code for causing the computer to access the alternate BIOS image for execution.

BRIEF DESCRIPTION OF THE DRAWINGS

The invention is herein described, by way of example only, with reference to the accompanying drawings, wherein.

DESCRIPTION OF THE PREFERRED EMBODIMENTS

A preferred embodiment of the present invention is of a system and method for improved management of more than one BIOS image. Features of the invention include inter-alia one or more of the following: the capability to control the BIOS selection by both a CPU and by an embedded controller, the capability to automatically switch to the other BIOS if required, and the capability to remotely select a BIOS even if the CPU is not functioning.

The principles and operation of a system and method for improved management of more than one BIOS according to the present invention may be better understood with reference to the drawings and the accompanying description. All elements identical to those illustrated in prior art FIG. 1, 2, or 3 are identified by the same numbers, and only aspects of the invention which differ from the prior art are further discussed below. All examples given below are non-limiting illustrations of the invention described and defined herein.

Figure 4:
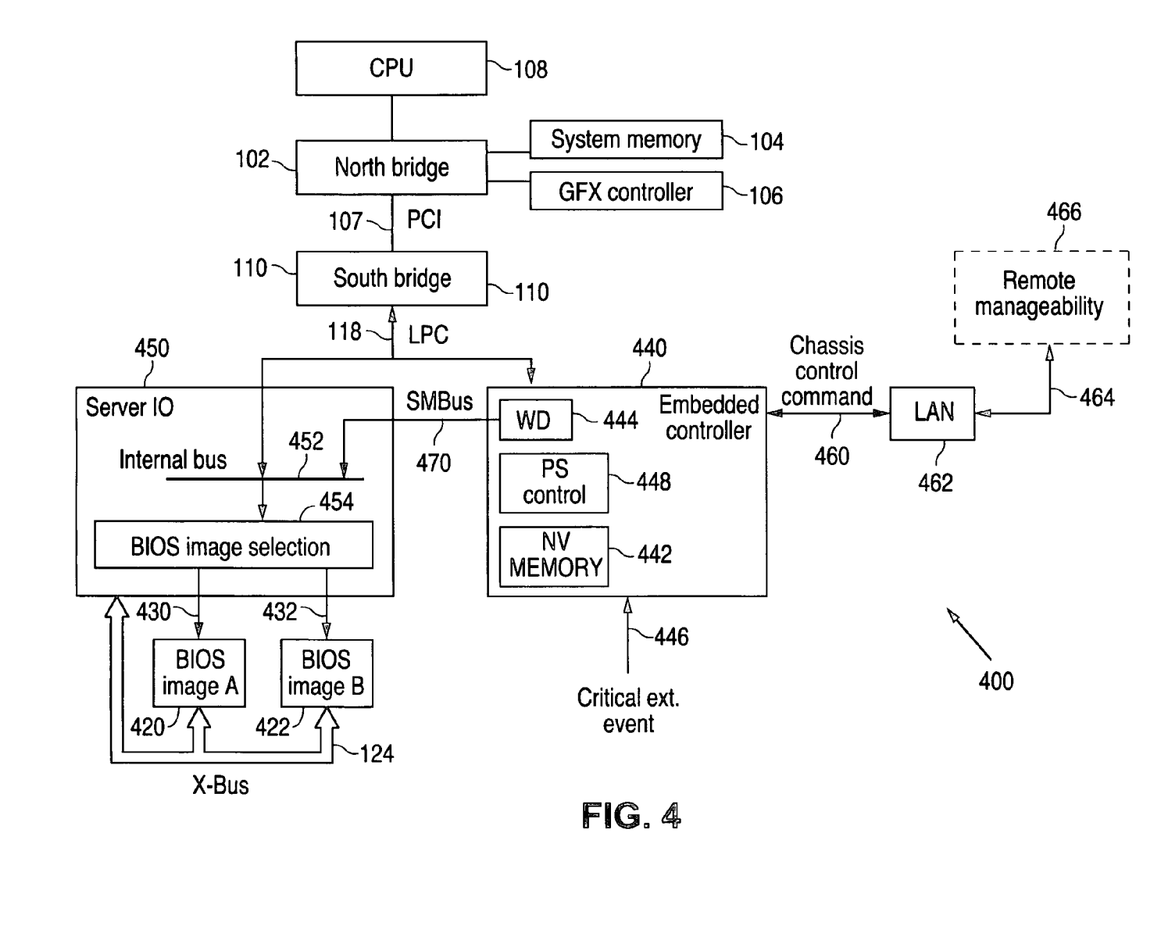
FIG. 4 is a block diagram of a computer system with BIOS selection in accordance with a preferred embodiment of the present invention.

Referring now to the drawings, FIG. 4 illustrates a system 400 according to a preferred embodiment of the invention where either an embedded controller 440 or CPU 108 can select the BIOS image. In the illustrated embodiment, an embedded controller 440, for example a BMC, is coupled to a ServerIO 450 through a bus 470. In the description below, it is assumed that bus 470 is an SMBus; however, other buses are possible, such as for example an X-bus extension. CPU 108 is coupled to ServerIO 450 through LPC bus 118. A BIOS image selection module 454 included in ServerIO 450 selects BIOS image A 420 or BIOS image B 422 through indication 430 or 432 respectively. Image selection module 454 includes any suitable arbitration means to arbitrate between LPC 118 and SMBus 470 with regard to access to BIOS image selection module 454. Therefore either CPU 108 or embedded controller 440 can control the selection of the BIOS image. An example of a suitable arbitration means is disclosed in pending application Ser. No. 09/810,746 "Sharing of Functions between an Embedded Controller and a Host Processor" assigned to National Semiconductor, details of which are incorporated herein by reference.

Preferably, if there is a conflict between the BIOS selection indicated by CPU 108 and the BIOS selection indicated by controller 440, the BIOS selection indicated by controller 440 overrides the selection indicated by CPU 108.

BIOS image selection module 454 may operate using any suitable selection means. As a first example, assuming BIOS images A 420 and B 422 are stored in two separate non-volatile memory units (for example in two flash units) and indications 430 and 432 are chip selects, BIOS image selection module 454 may select the BIOS image through control registers which assert chip selects 430 and 432. As a second example, assuming BIOS images A 420 and B 422 are stored in a single non-volatile memory unit (for example a single flash unit) and indications 430 and 432 represent addresses, BIOS image selection module 454 may select the BIOS image by indicating the corresponding address.

As in the prior art, CPU 100 indicates the addresses within the selected BIOS images via ServerIO 450 and X-Bus 124.

In one embodiment of the invention illustrated in FIG. 4, embedded controller 440 includes a non-volatile memory 442 for storing an indication of which of the two BIOS images 420-422 is currently active for starting up system 400. Embedded controller 440 and BIOS image selection module 454 are powered by a standby voltage in addition to the main power so that embedded controller 440 and BIOS image selection module 454 can still operate when the main power is down. Upon reset or power down of system 400, the firmware of embedded controller 440 reads the indication from non-volatile memory 442 and transfers an indication of the active BIOS image to BIOS image selection module 454 via SMBus 470.

In some embodiments where CPU 108 also exercises control over BIOS selection, if CPU 108 has made a BIOS selection, an indication of the CPU selection can be transferred to embedded controller 440 via SMBus 470 for storage in non-volatile memory 442. However, in other embodiments, this transfer is not required. Instead, embedded controller 440 ignores any selections made by embedded controller 440 and considers the last BIOS selected by controller 440 to be the active BIOS. If later the BIOS image is to be switched (as will be explained below), embedded controller 440 resets or powers down system 400, and writes an indication of the other BIOS image (i.e. the image whose indication is not currently stored in the non-volatile memory) to non-volatile memory 442. An indication of the selection of the other BIOS image is also transferred via SMBus 470 to BIOS image selection module 454 so that the other BIOS image will be selected.

In alternative embodiments, controller 440 is connected to non volatile memory 442, for example an external flash, EEPROM or any other non-volatile memory.

Figure 5:
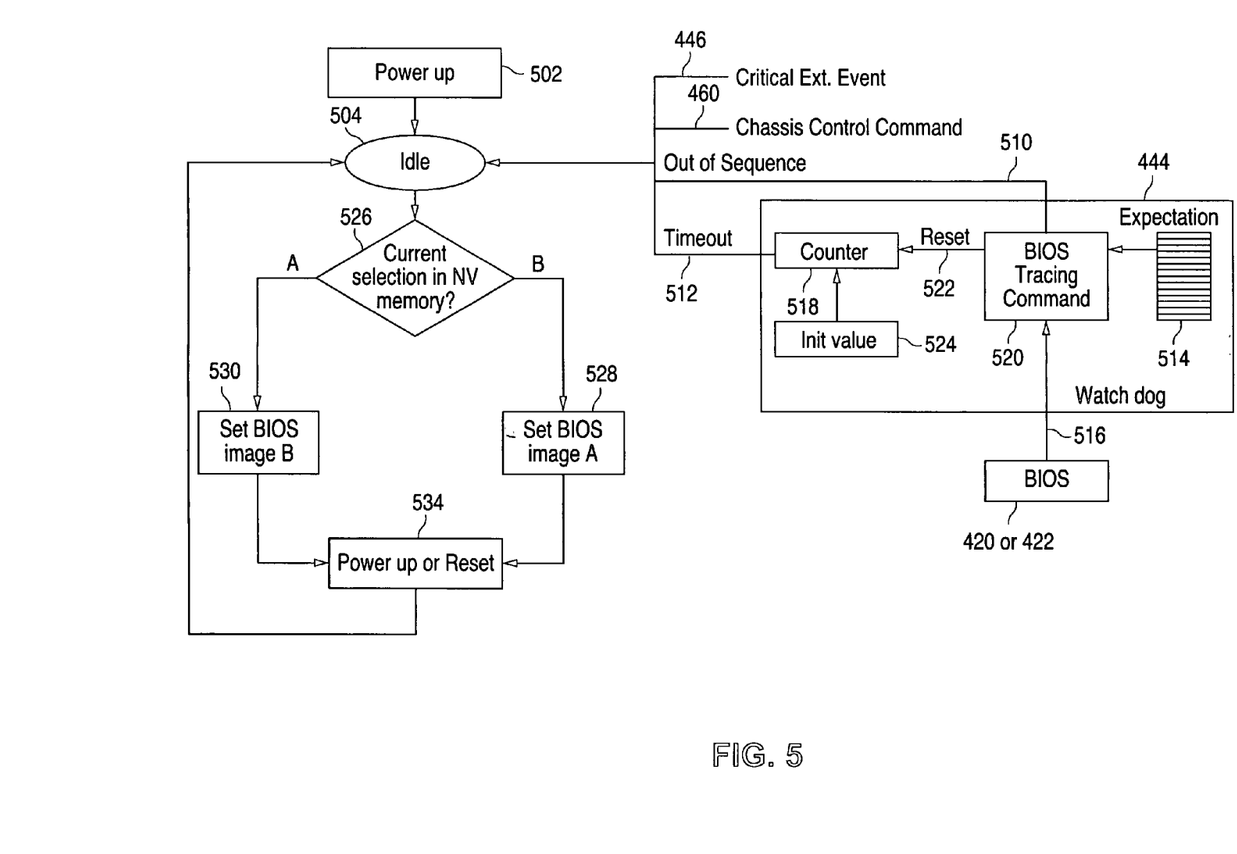
FIG. 5 illustrates a system and method for determining whether the BIOS image is to be switched, in accordance with a preferred embodiment of the present invention.

Refer to FIG. 5 which illustrates a system and method for determining whether the BIOS image is to be switched, according to a preferred embodiment of the present invention. FIG. 5 will be explained in conjunction with FIG. 4. In step 502, system 400 is powered up and the selected BIOS image is accessed. Embedded controller 440 remains in the idle state (step 504) waiting for an indication that the BIOS image is to be switched. In the illustrated embodiment, there are three possible triggers for switching a BIOS image. The first is an external critical event indication 446. Examples of external critical events include temperatures or voltages out of range which are indicated by temperature or voltage sensors.

The second trigger is a chassis control command 460 (i.e. a remote command). Refer back to FIG. 4. A remote manageability module 466 is coupled to embedded controller 440 for example via a local area network (LAN) 462 or a serial interface. A chassis control command 460 to change the BIOS image may be sent to embedded controller 440 by remote manageability module 466 for example, if no response is received or if the extra features of the non-active BIOS are desired. Remote manageability module 466 may work automatically or may be operated manually.

Figure 6:
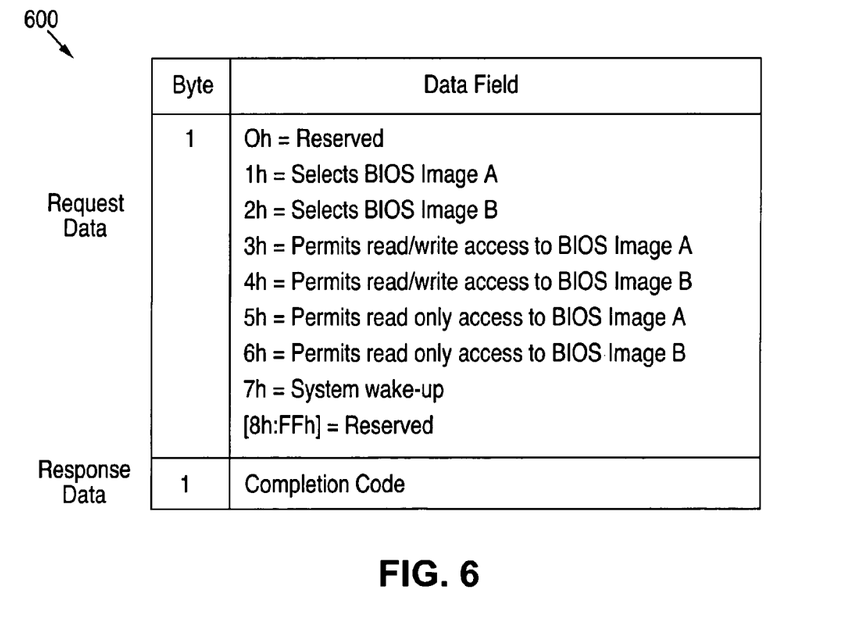
FIG. 6 is a table of chassis commands supported by a local area network, in accordance with a preferred embodiment of the present invention.

FIG. 6 illustrates chassis commands supported by LAN 462, according to a preferred embodiment of the present invention. For the purposes of the present discussion, the relevant chassis commands are "selects BIOS image A" (data field "1h") and "selects BIOS image B" (data field "2h"). In an embodiment where BIOS image A is stored on flash A and image B on flash B, the commands can instead be adapted to "selects BIOS flash A" and "selects BIOS flash B", respectively.

The third trigger is from a watchdog 444, located in the illustrated embodiment in embedded controller 440. An example of the operation of watchdog 444 will now be discussed. When the selected BIOS 420 or 422 boots up system 400, selected BIOS 420 or 422 sends the post operation codes to controller 440. The received post operation codes are shown in FIG. 5 as expectation 514. A BIOS tracing command 520 compares the sequence of operation codes in expectation 514 with the actual executed sequence of operation codes of selected BIOS image 420 or 422. If an executed operation code does not equal the expected operation code, an out of sequence indication 510 indicates that the alternate BIOS image 422 or 420 should be switched to. In addition, upon a power up or reset, counter 518 receives a reset indication 522 and begins counting down from an initial value 524. Each time an executed operation code matches the expected operation code, counter 518 again receives a reset indication 522 and resets to initial value 524. If the time interval from the last matching operation code exceeds a pre-determined limit, i.e. counter 518 counts down to zero, a timeout indication 512 indicates that the alternate BIOS image 422 or 420 should be switched to.

Assuming one of the indications mentioned above is asserted, the power is reset or powered down. In step 526, embedded controller 440 checks non-volatile memory 442 to determine the stored indication of the active BIOS image 420 or 422 (either the last BIOS image selected by controller 440 or the last BIOS image selected by either controller 440 or CPU 108, as explained above). In steps 530 or 528 controller 440 indicates to selection module 454 that the alternate BIOS image 422 or 420 should be selected and controller 440 stores in memory 442 an indication that the alternate BIOS image 422 or 420 is now active. In step 534, the system 400 is again reset or powered up and the alternate image 422 or 420 is accessed. The idle cycle then begins again.

In one embodiment, upon power-down or reset, controller 440 selects the BIOS image indicated in non-volatile memory 442. Controller 440 then does not make any further selection until the next power-down or reset unless triggered by for example chassis control command 460, critical external event 446 or watchdog 444. If no trigger occurs, then any further selections of BIOS until the next power down or reset are performed by CPU 108. If a trigger occurs, then controller 440 selects an alternate BIOS image to that stored in memory 442.

Figure 7:
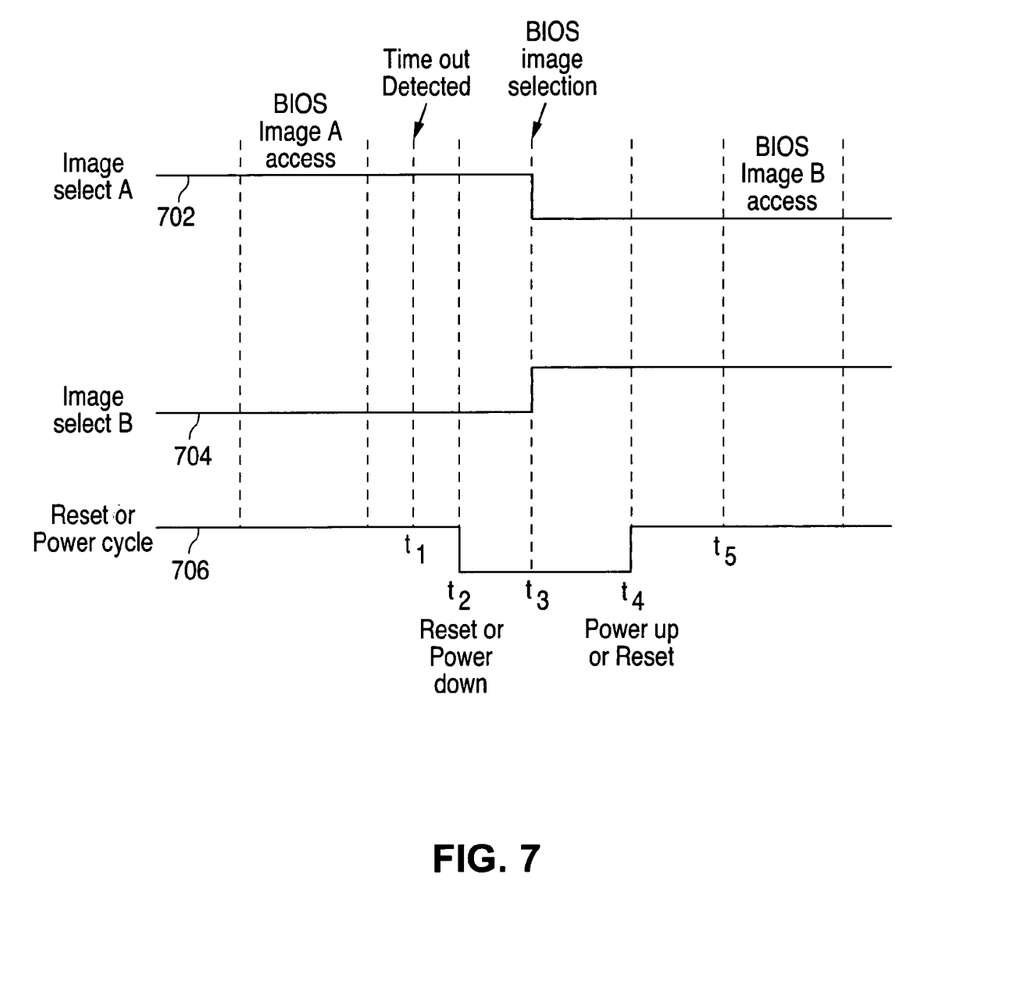
FIG. 7 is a timing diagram of switching to a different BIOS image, in accordance with a preferred embodiment of the present invention.

FIG. 7 shows a timing diagram, according to a preferred embodiment of the present invention. Image select A 702 and image select B 704 represent indications 430 and 432 respectively. It should be noted that the selection of a different BIOS image may only occur when system 400 is powered down or reset. It is assumed in FIG. 7 that BIOS image A 420 is the initially selected BIOS. At point $t_1$ in time, a timeout is detected (or any other trigger, for example external event, chassis, other watchdog). The system 400 is therefore reset or powered down at time $t_2$. Controller 440 then determines that BIOS image A 420 is active, for example by checking non-volatile memory 442, and transmits via SMBus 470 an indication of selection of BIOS image B 422. At time $t_3$, selection module 454 selects BIOS image B 422 and deselects BIOS image A 420. At time $t_4$, the system 400 is reset or powered up. At time $t_5$, BIOS image B 422 is accessed.

Figure 8:
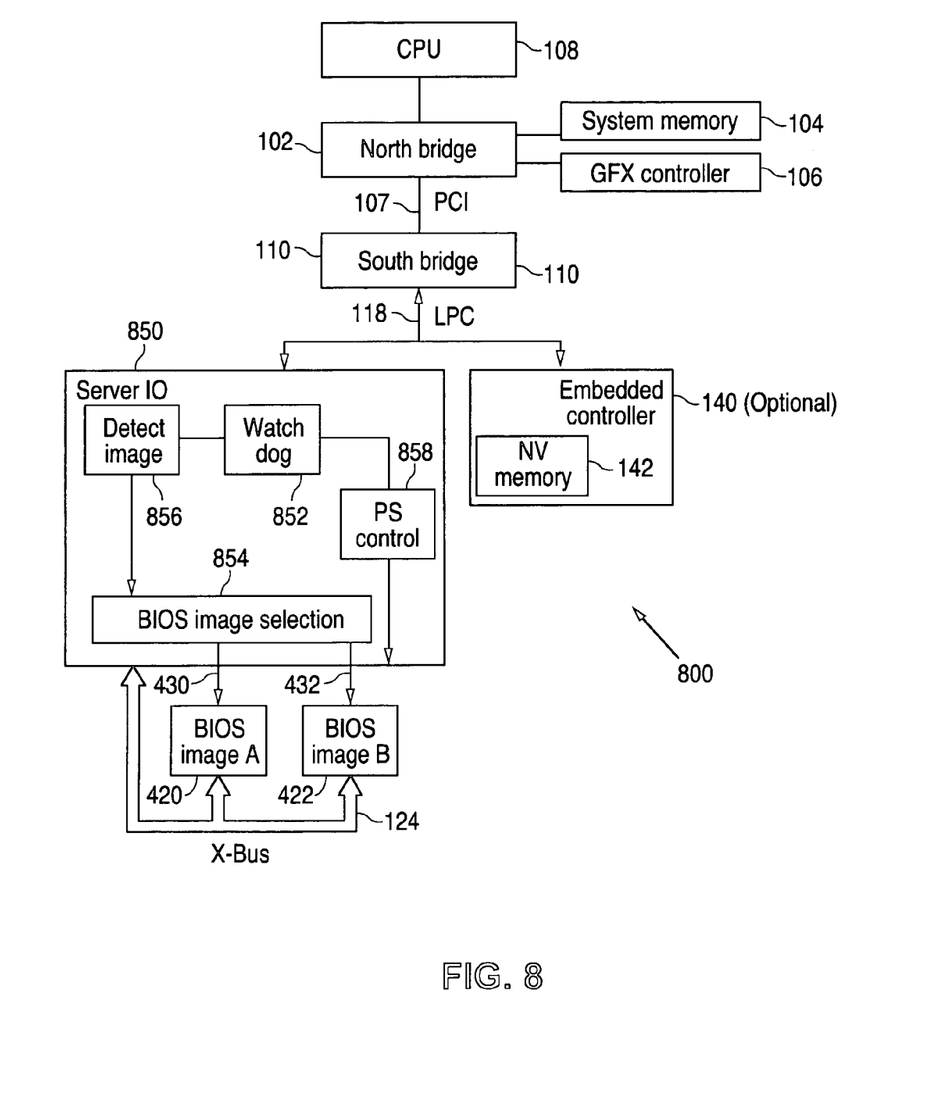
FIG. 8 is a block diagram of another computer system with BIOS selection, in accordance with a preferred embodiment of the present invention.

FIG. 8 shows another possible configuration, in accordance with another preferred embodiment of the present invention. In this configuration there is no controller 140 or there is a controller 140 which excludes the BIOS selection features of controller 440. In the illustrated system 800, a watchdog 852 is included in a ServerIO 850 to enable an automatic switch-over to the alternate BIOS image if required. Watchdog 852 can be of a similar configuration as watchdog 444, outputting an out-of-sequence signal 510 or a timeout signal 512 if appropriate. A detect image module 856, powered by a backup battery in addition to the main power supply, is included in ServerIO 850 for indicating a selection to BIOS image selection module 854. (BIOS image selection module 854 is also powered by a standby voltage in addition to the main power supply). Preferably, if there is a conflict between a selection by CPU 108 and ServerIO 850, the selection by ServerIO 850 overrides the selection by CPU 108.

In operation in accordance with one embodiment, upon power down or reset, detect image 856 indicates a default BIOS image A or B selection to BIOS image selection module 854. ServerIO 850 then does not make any further selection until the next power-down or reset unless triggered by for example watchdog 852. If no trigger occurs, then any further selections of BIOS until the next power up are performed by CPU 108. If a trigger occurs, then detect image 856 toggles the BIOS, i.e. indicates to BIOS image selection module 854 a different BIOS than the BIOS previously selected by either CPU 108 or ServerIO 850. Power up of system 800 is then initiated using power switch control 858. Preferably, the different BIOS image continues to be used for any subsequent power-ups, provided no intervening triggers occur.

For ease of understanding the invention has been described above for a system including two BIOS images. However in some preferred embodiments, the system can include more than two BIOS images. In these embodiments, if a switch to an alternate BIOS image is required, an alternate BIOS image may be selected from the plurality of non-active BIOS images using any algorithm suitable to the application. For example, in one embodiment there may be a linking between each image with a different image so if a switch is needed the switch is to the linked image. As another example, if more than one backup image is stored, the switch in one embodiment can be to the backup whose creation data is closest in time (and earlier) to the creation date of the currently active image. As yet another example, if there is one alternate image which is the version from manufacture, in one embodiment the switch may be to the version from manufacture.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While the invention has been described with respect to a limited number of embodiments, it will be appreciated that many variations, modifications and other applications of the invention may be made.

What is claimed is:

1. A system for selecting one of a plurality of BIOS images, comprising:
   a server input/output configured to access a plurality of BIOS images;
   an embedded controller configured to select one of the plurality of BIOS images for access;
   a bus coupling said embedded controller and said server input/output which is configured to transfer an indication of BIOS image selection from said embedded controller to said server input/output; and
   a remote manageability unit configured to transmit a chassis control command to the embedded controller for changing the selected BIOS image.

2. The system of claim 1, further comprising:
   a watchdog coupled to said embedded controller or integrated therein which is configured to generate an indication of malfunction of BIOS execution.

3. The system of claim 1, further comprising:
   a sensor configured to indicate a critical external event to said embedded controller.

4. The system of claim 1, wherein said bus is an SMBus.

5. The system of claim 1, wherein said embedded controller is a baseboard management controller.

6. For use in conjunction with a central processing unit (CPU), a system for automatic switching of BIOS images, comprising:
   a watchdog configured to detect at least one of: a sequence malfunction and a timing malfunction in execution of a BIOS image;
   a selector configured to select an alternate BIOS image, wherein the selector remains operable when main power to the CPU is down; and
   a server input/output configured to access the BIOS images;
   wherein the selector includes a detect image module configured to toggle a BIOS selection if the watchdog detects at least one of the malfunctions.

7. The system of claim 6, wherein said watchdog is coupled to an embedded controller or integrated therein and said selector includes a non-volatile memory configured to store an indication of a particular BIOS so that upon indication of malfunction, a BIOS image other than said particular BIOS image is selected.

8. The system of claim 6, further comprising:
   a sensor configured to indicate a critical external event associated with at least one of said malfunctions.

9. The system of claim 6, wherein said malfunction is determined by an out of sequence operation code during execution of said BIOS image.

10. The system of claim 6, wherein said malfunction is determined by a time interval between execution of two operation codes for said BIOS image exceeding a predetermined length.

11. A method for selecting one of a plurality of BIOS images included in a computer system, comprising:
    selecting one of the BIOS images based on receipt of a chassis control command necessitating the selection of said BIOS image;
    at least one of: powering down and resetting the system;
    using a microcontroller to indicate, through a server input/output, the selection of one of the BIOS images via a bus;
    at least one of: powering up and resetting the system; and
    accessing said selected BIOS image for execution.

12. The method of claim 11, wherein said bus is an SMBus.

13. The method of claim 11, wherein selecting one of the BIOS images comprises:
    receiving an indication of a critical external event necessitating the selection of said BIOS image.

14. The method of claim 11, wherein selecting one of the BIOS images comprises:
    receiving an indication of a malfunction in execution of a different BIOS, thereby necessitating the selection of said BIOS image.

15. A method for automatic switching of BIOS images for a computer system, comprising:
    detecting a malfunction in execution of a BIOS image;
    at least one of: powering down and resetting the system;
    selecting an alternate BIOS image;

at least one of: powering up and resetting the system; and accessing said alternate BIOS image for execution.

16. The method of claim 15, further comprising:
generating an out-of-sequence indication if said malfunction is detected by an out of sequence operation code in execution of said BIOS image.

17. The method of claim 15, further comprising:
generating a time-out indication if said malfunction is detected by an interval between operation codes of said BIOS image exceeding a pre-determined length.

18. A program storage device readable by machine, tangibly embodying a program of instructions executable by the machine to perform method steps for automatic switching of BIOS images for a computer system, comprising:
   detecting a malfunction in BIOS execution;
   at least one of: powering down and resetting the system;
   selecting an alternate BIOS image;
   at least one of: powering up and resetting the system; and accessing said alternate BIOS image for execution.

19. A computer program product comprising a computer useable medium having computer readable program code embodied therein for automatic switching of BIOS images for a computer system, the computer program product comprising:
   computer readable program code for causing the computer to detect a malfunction in BIOS execution;
   computer readable program code for causing the computer to at least one of: power down and reset the system;
   computer readable program code for causing the computer to select an alternate BIOS image;
   computer readable program code for causing the computer to at least one of: power up and reset the system; and
   computer readable program code for causing the computer to access said alternate BIOS image for execution.

* * * * *